US012617463B2

(12) United States Patent
Lietonen

(10) Patent No.: US 12,617,463 B2
(45) Date of Patent: May 5, 2026

(54) HYDRAULIC CYLINDER MOUNTING ARRANGEMENT

(71) Applicant: SANDVIK MINING AND CONSTRUCTION OY, Tampere (FI)

(72) Inventor: Jani Lietonen, Svedala (SE)

(73) Assignee: Sandvik Mining and Construction Oy, Tampere (FI)

( * ) Notice: Subject to any disclaimer, the term of this patent is extended or adjusted under 35 U.S.C. 154(b) by 567 days.

(21) Appl. No.: 18/022,249

(22) PCT Filed: Aug. 26, 2020

(86) PCT No.: PCT/EP2020/073895
§ 371 (c)(1),
(2) Date: Feb. 20, 2023

(87) PCT Pub. No.: WO2022/042837
PCT Pub. Date: Mar. 3, 2022

(65) Prior Publication Data
US 2023/0347977 A1 Nov. 2, 2023

(51) Int. Cl.
| | |
|---|---|
| *B62D 12/00* | (2006.01) |
| *B60D 1/00* | (2006.01) |
| *B60D 1/44* | (2006.01) |
| *B62D 53/02* | (2006.01) |
| *E02F 9/08* | (2006.01) |

(52) U.S. Cl.
CPC .............. *B62D 12/00* (2013.01); *B60D 1/44* (2013.01); *B62D 53/021* (2013.01); *E02F 9/0841* (2013.01); *B60D 2001/008* (2013.01)

(58) Field of Classification Search
CPC ...... B62D 12/00; B62D 53/021; B62D 53/02; B60D 1/44; B60D 2001/008; E02F 9/0841
See application file for complete search history.

(56) References Cited

U.S. PATENT DOCUMENTS

| | | | | |
|---|---|---|---|---|
| 3,157,239 A * | 11/1964 | Bernotas | ................ | B62D 49/04 |
| | | | | 180/370 |
| 3,326,312 A * | 6/1967 | Buller | .................... | B62D 12/00 |
| | | | | 280/43.23 |
| 3,326,316 A * | 6/1967 | Thassy | .................. | B62D 12/00 |
| | | | | 180/420 |

(Continued)

FOREIGN PATENT DOCUMENTS

| | | |
|---|---|---|
| CN | 102562073 A | 7/2012 |
| CN | 110194215 A | 9/2019 |

(Continued)

*Primary Examiner* — Timothy Wilhelm
(74) *Attorney, Agent, or Firm* — Corinne R. Gorski

(57) ABSTRACT

A mining vehicle and a cylinder mounting arrangement for a mining vehicle have a frame including at least one hydraulic cylinder mounted to the frame. The cylinder has a cylinder pin arranged for the mounting. The frame has an opening through which the cylinder can be inserted inside the frame and also removed. A mounting element is assembled to one end of the cylinder and the mounting element includes a front plate assembled against the outside of the frame covering the opening at least partially and two ears for the attachment to the cylinder pin. The front plate is fixed to the frame by mounting bolts or screws from the outside the frame.

7 Claims, 5 Drawing Sheets

(56)                References Cited

U.S. PATENT DOCUMENTS

| | | | | |
|---|---|---|---|---|
| 3,334,702 A * | 8/1967 | Granryd | .................... | E02F 3/84 |
| | | | | 180/243 |
| 3,510,178 A | 5/1970 | Sowatzke | | |
| 4,081,046 A * | 3/1978 | Stone | .................... | B62D 53/021 |
| | | | | 180/14.4 |
| 4,453,614 A * | 6/1984 | Allen | ..................... | B62D 53/02 |
| | | | | 180/420 |
| 4,552,224 A * | 11/1985 | Luscombe | ............... | B60D 1/44 |
| | | | | 172/324 |
| 4,890,684 A | 1/1990 | Simmons | | |
| 5,632,350 A * | 5/1997 | Gauvin | .................... | B60D 1/00 |
| | | | | 280/492 |
| 5,873,431 A * | 2/1999 | Butler | .................. | B62D 53/026 |
| | | | | 180/418 |
| 6,488,291 B1 * | 12/2002 | Bellis, Jr. | ............. | B62D 63/065 |
| | | | | 280/492 |
| 6,604,351 B2 * | 8/2003 | Dillon | ................ | A01D 41/1208 |
| | | | | 180/418 |
| 6,926,113 B2 * | 8/2005 | Hennemann | .......... | B62D 12/00 |
| | | | | 180/417 |
| 8,282,306 B2 * | 10/2012 | Koch | ....................... | B60D 1/50 |
| | | | | 403/154 |
| 8,333,543 B1 * | 12/2012 | Simmons | ................ | B60P 1/006 |
| | | | | 414/416.04 |
| 8,727,059 B2 * | 5/2014 | Anliker | ................... | E01C 19/26 |
| | | | | 280/468 |
| 10,131,380 B1 * | 11/2018 | Simmons | ............. | B62D 53/021 |
| 10,328,758 B2 * | 6/2019 | Parks | ....................... | B60D 1/18 |
| 11,364,752 B2 * | 6/2022 | Lietonen | ................. | B60D 1/04 |
| 2005/0039973 A1 * | 2/2005 | Clark | .................... | B62D 12/00 |
| | | | | 180/418 |
| 2012/0200064 A1 | 8/2012 | Gallego et al. | | |
| 2016/0075197 A1 * | 3/2016 | Coleman | ........... | B62D 53/0857 |
| | | | | 280/433 |
| 2017/0100974 A1 * | 4/2017 | Smith | ................. | A01B 59/068 |
| 2024/0023481 A1 * | 1/2024 | Longueville | ............ | B60D 1/02 |

FOREIGN PATENT DOCUMENTS

| | | | |
|---|---|---|---|
| DE | 102010014811 A1 | 11/2010 | |
| KR | 101276544 B1 | 6/2013 | |

* cited by examiner

HYDRAULIC CYLINDER MOUNTING ARRANGEMENT

RELATED APPLICATION DATA

This application is a § 371 National Stage Application of PCT International Application No. PCT/EP2020/073895 filed Aug. 26, 2020

BACKGROUND OF THE INVENTION

The invention relates to a hydraulic cylinder mounting arrangement including: a mining vehicle having a frame; and at least one hydraulic cylinder mounted to the frame of the vehicle, the cylinder having a cylinder pin for the mounting. The invention also relates to a mining vehicle.

This invention relates to mounting of hydraulic cylinders, for example hydraulic steering cylinders, to underground mining vehicles, such as articulated underground loaders or trucks with frame steering.

Currently, the fastening pin of the steering cylinder is typically mounted to a corner box or the hydraulic tank of the vehicle frame with two mounting plates. Both mounting plates have a semi-circular recess facing against each other and thus forming a circular hole for the fastening pin of the cylinder. Of course, similar arrangement is needed for fastening the other end of the fastening pin of the cylinder, too.

In the known construction the first mounting plate is welded to the frame (usually to a corner box or hydraulic tank) of the vehicle and the second mounting plate is fastened to the first mounting plate with mounting bolts. Both mounting plates are machined as a pair bolted together. Hence, they form a unique pair. If the second mounting plate is damaged or disappears, both mounting plates must be replaced at the same time. The problem with the current construction is that it is not possible to remove the used first mounting plate without machining, because the first mounting plate has been welded to the vehicle frame. The machining is time consuming and laborious.

Another problem is that the remounting of the cylinder pin is difficult in a confined space, because the cylinder is heavy and there are many parts to be removed and remounted.

SUMMARY OF THE INVENTION

An object of the invention is to provide a new arrangement for mounting a hydraulic cylinder so that the problems existing in the current mountings can be solved. The arrangement of the present invention is characterized in that the frame has an opening through which the cylinder can be inserted inside the frame and also removed, and that a mounting element has been assembled to one end of the cylinder, the mounting element including a front plate being assembled against the outside of the frame covering the opening at least partially and two ears for the attachment to the cylinder pin, and that the front plate is fixed to the frame by mounting bolts or screws from the outside the frame.

In one embodiment of the invention the vehicle is an articulated mining vehicle having a front frame and a rear frame coupled to each other by an articulating pin, and that the cylinder is a steering cylinder one end of which is mounted to the front frame and the other end to the rear frame, and that the opening is in the rear frame.

In one embodiment of the invention a support guide has been mounted in the rear frame, along which the cylinder can be pushed in and pulled out.

In one embodiment of the invention the mounting bolts or screws are assembled in two rows, one above the opening and one below the opening each row having six mounting bolts or screws.

Another object of the invention is to provide a mining vehicle in which the problems existing in the current vehicles have been solved.

One advantage of the invention is that when the cylinder or its mounting parts must be replaced, the cylinder pin, washers and seals can be preassembled on a mounting desk. It is possible to have significant time savings due to easy and fast mounting. It is even possible to pin the cylinder before the old one is removed. It is also not necessary to turn the machine frame when cylinder is assembled or disassembled. Further, the cylinder can be crane lifted during the whole procedure.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Figure 1:
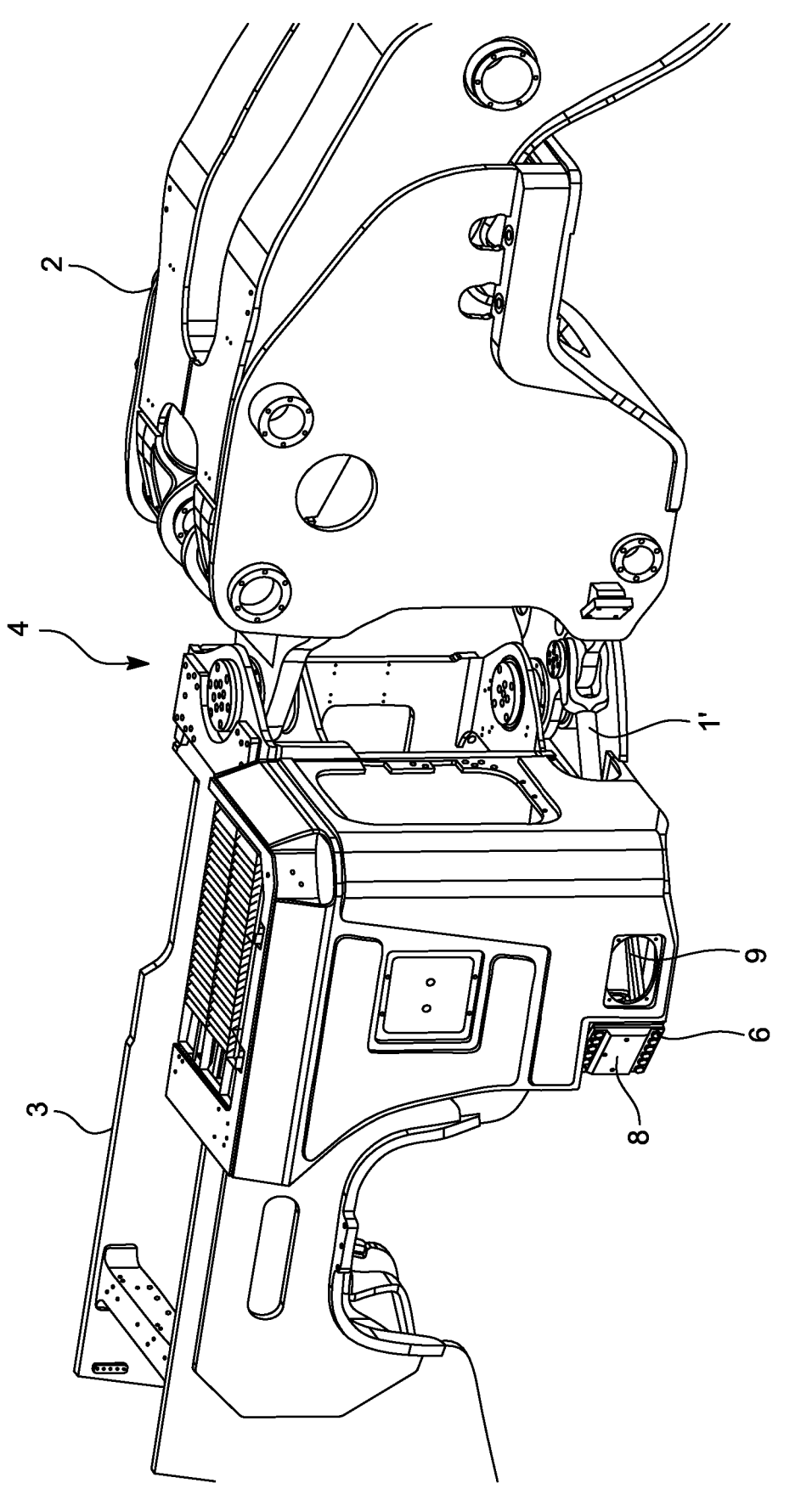
FIG. 1 is a view of the cylinder mounting arrangement according to the present invention in a first position.
Figure 2:
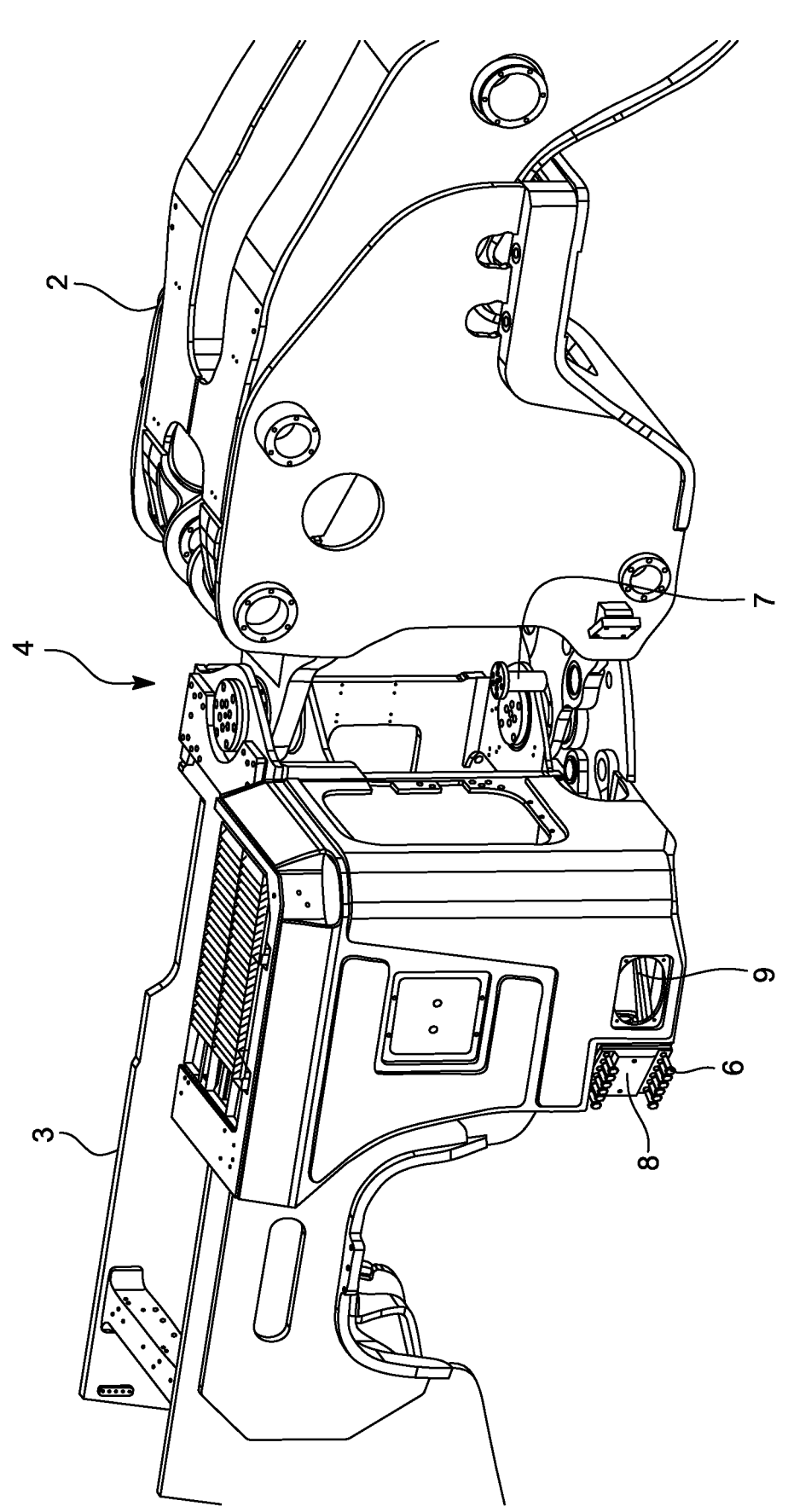
FIG. 2 is a view of the cylinder mounting arrangement according to the present invention in a second position.
Figure 3:
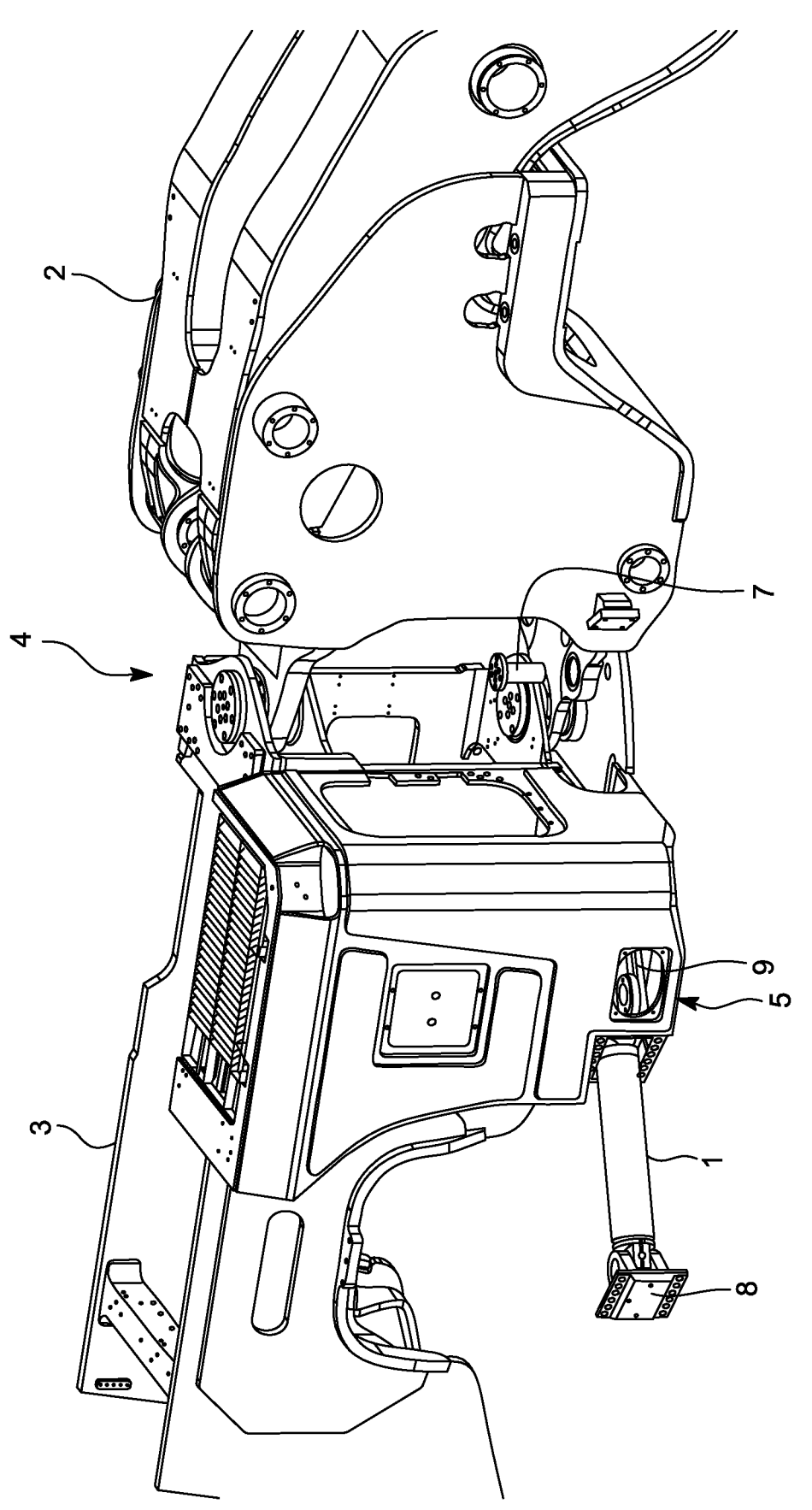
FIG. 3 is a view of the cylinder mounting arrangement according to the present invention in a third position.

In FIGS. 1-3 a cylinder mounting arrangement according to the invention has been shown in a perspective view. This kind of hydraulic cylinder 1 (FIG. 3) can be used for example as a steering cylinder in mining vehicles, for example underground vehicles, such as an articulated underground loader or truck. In FIGS. 1 and 2 only piston 1' of the cylinder 1 can be seen. The vehicle has a front frame 2 and a rear frame 3 coupled to each other by an articulating pin 4. The front frame 2 and the rear frame 3 are turned in relation to each other by the steering cylinder 1.

The invention is focused on the mounting of the cylinder 1 to the rear frame 3. The mounting of the piston 1' of the cylinder 1 to the front frame 2 may be conventional and shall not be explained in more detail here.

For the mounting of the cylinder 1 to the vehicle, the rear frame 3, preferably a corner box of the rear frame 3, must have an opening 5 through which the cylinder 1 is inserted into its place and also removed. In FIG. 1 a position has been shown, where the cylinder 1 has already been mounted and can be operated for steering purposes. The mounting to the rear frame 3 has been tightened with mounting bolts 6 or screws, which have been inserted through a front plate 8' of a mounting element 8 and screwed to the rear frame 3. In this case the mounting bolts 6 are situated on the upper side and lower side of the opening 5. There are totally 12 mounting bolts or screws, but the amount can of course vary. The rear frame has of course holes with inner threads to receive the mounting bolts 6.

In FIG. 2 a position has been shown, where the mounting bolts 6 have been loosened and the piston 1' has been released from the front frame 2 by removing the fastening pin 7.

Further, in FIG. 3 a position has been shown, where the mounting bolts have been removed and most of the cylinder 1 has been pulled out from the opening 5 of the rear frame 3. To assist this pulling a support guide 9 can been mounted in the rear frame 3, along which the cylinder 1 can be pulled out. This pulling can be done manually. Of course, the same support guide 9 is used when inserting a new cylinder 1 into the frame.

After the cylinder end has been pulled out from the opening 5, it can be supported for example by a crane (not shown). Just before the whole cylinder 1 is out, the other end can also be supported by the crane and then the whole cylinder 1 can be lifted away.

Figure 4:
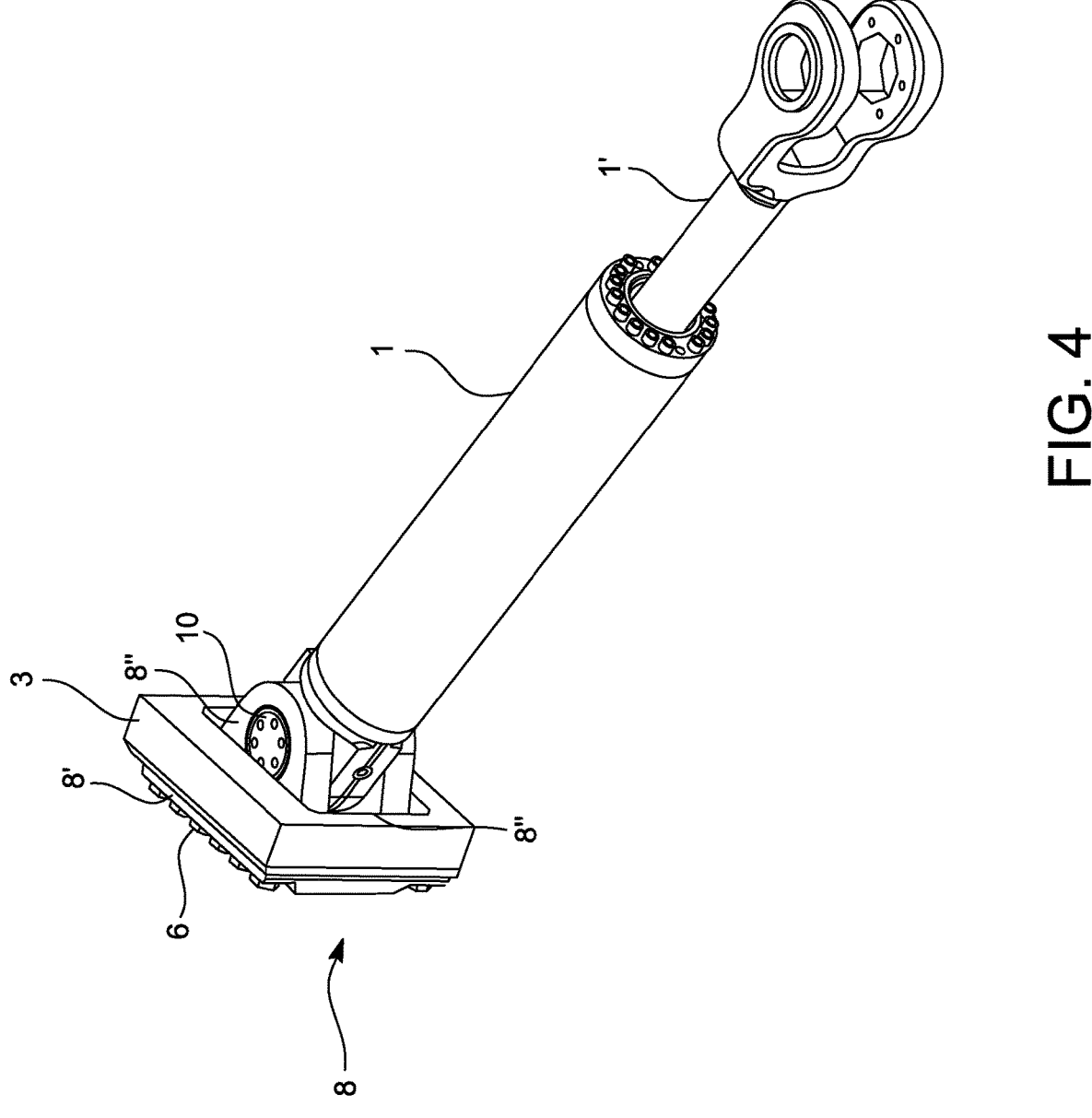
FIG. 4 is a perspective view of the cylinder with a part of the frame of the vehicle.
Figure 5:
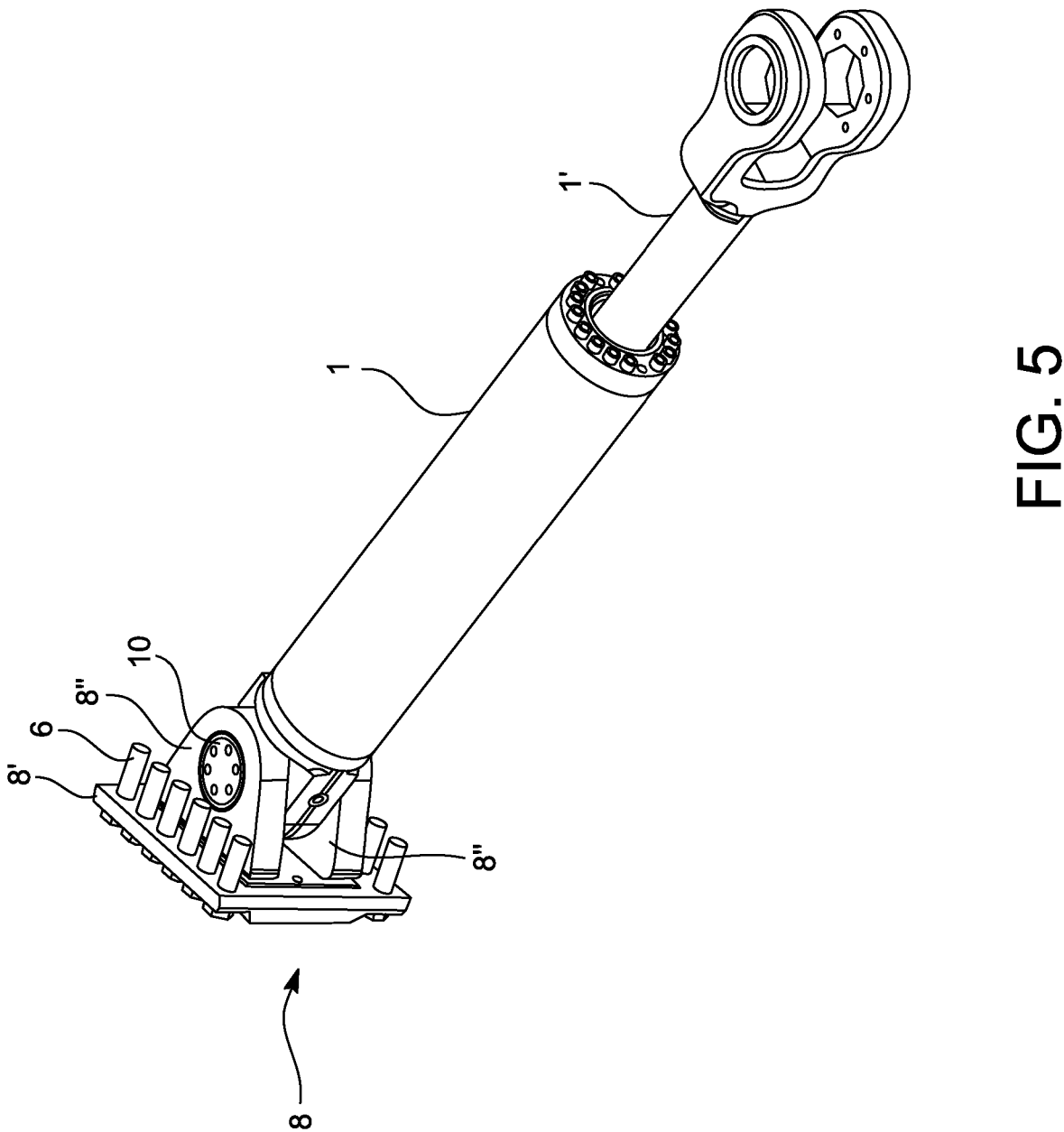
FIG. 5 is a perspective view of the cylinder without a part of the frame of the vehicle.

FIGS. 4 and 5 show the cylinder mounting of the present invention in more detail. In FIG. 4 the reference number 3 refers to the rear frame. Of course, only a part of it is shown in FIG. 4. Reference number 8 refers to the mounting element, which includes a front plate 8' and two ears 8" behind the front plate 8', the ears being mounted around a cylinder pin 10. One ear 8" surrounds one end of the cylinder pin 10 and the other ear 8" surrounds the other end of the cylinder pin (10).

FIG. 5 shows the same as FIG. 4 except that the frame part 3 has been removed. This clarifies how the mounting bolts 6 are assembled in two rows, one above the opening and one below the opening each row having six mounting bolts.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A cylinder mounting arrangement for a mining vehicle having a frame, the mounting arrangement comprising:
   at least one hydraulic cylinder mounted to the frame of the vehicle, the at least one cylinder having a cylinder pin arranged for the mounting, wherein the frame has an opening through which the cylinder can be inserted inside the frame and also removed, wherein the vehicle is an articulated mining vehicle having a front frame and a rear frame coupled to each other by an articulating pin, and that the cylinder is a steering cylinder, a first end of which is mounted to the front frame and a second end to the rear frame, and wherein the opening is in the rear frame; and
   a mounting element assembled to one end of the cylinder, the mounting element including a front plate assembled against an outside of the frame, the front plate covering the opening at least partially and two ears arranged for the attachment to the cylinder pin, and wherein the front plate is fixed to the frame by mounting bolts or screws from the outside the frame.

2. The cylinder mounting arrangement according to claim 1, further comprising a support guide mounted in the rear frame, the cylinder being arranged to be pushed in and pulled out along the support guide.

3. The cylinder mounting arrangement according to claim 1, wherein the mounting bolts or screws are assembled in two rows, one above the opening and one below the opening, each row having six mounting bolts or screws.

4. A mining vehicle comprising:
   a frame;
   at least one hydraulic cylinder mounted to the frame of the vehicle, the cylinder having a cylinder pin for the mounting, wherein the frame has an opening through which the cylinder can be inserted into the frame and also removed; and
   a mounting element assembled to one end of the cylinder, the mounting element including a front plate assembled against an outside of the frame to cover the opening at least partially and two ears arranged for attachment to the cylinder pin, wherein the front plate is fixed to the frame by mounting bolts or screws from the outside the frame, wherein the vehicle is an articulated mining vehicle having a front frame and a rear frame coupled to each other by an articulating pin, and wherein the cylinder is a steering cylinder, a first end of which is mounted to the front frame and a second end to the rear frame, and wherein the opening is in the rear frame.

5. A mining vehicle comprising:
   a frame;
   at least one hydraulic cylinder mounted to the frame of the vehicle, the cylinder having a cylinder pin for the mounting, wherein the frame has an opening through which the cylinder can be inserted into the frame and also removed;
   a mounting element assembled to one end of the cylinder, the mounting element including a front plate assembled against an outside of the frame to cover the opening at least partially and two ears arranged for attachment to the cylinder pin, wherein the front plate is fixed to the frame by mounting bolts or screws from the outside the frame; and
   a support guide mounted in the rear frame, the cylinder being arranged to be pushed in and pulled out along the support guide.

6. The mining vehicle according to claim 4, wherein the mounting bolts or screws are assembled in two rows, one above the opening and one below the opening, each row having six mounting bolts or screws.

7. The mining vehicle according to claim 5, wherein the mounting bolts or screws are assembled in two rows, one above the opening and one below the opening, each row having six mounting bolts or screws.

\* \* \* \* \*